J. Bathgate,
Chalk-Line Holder.
N°. 70,684. Patented Nov. 12, 1861.
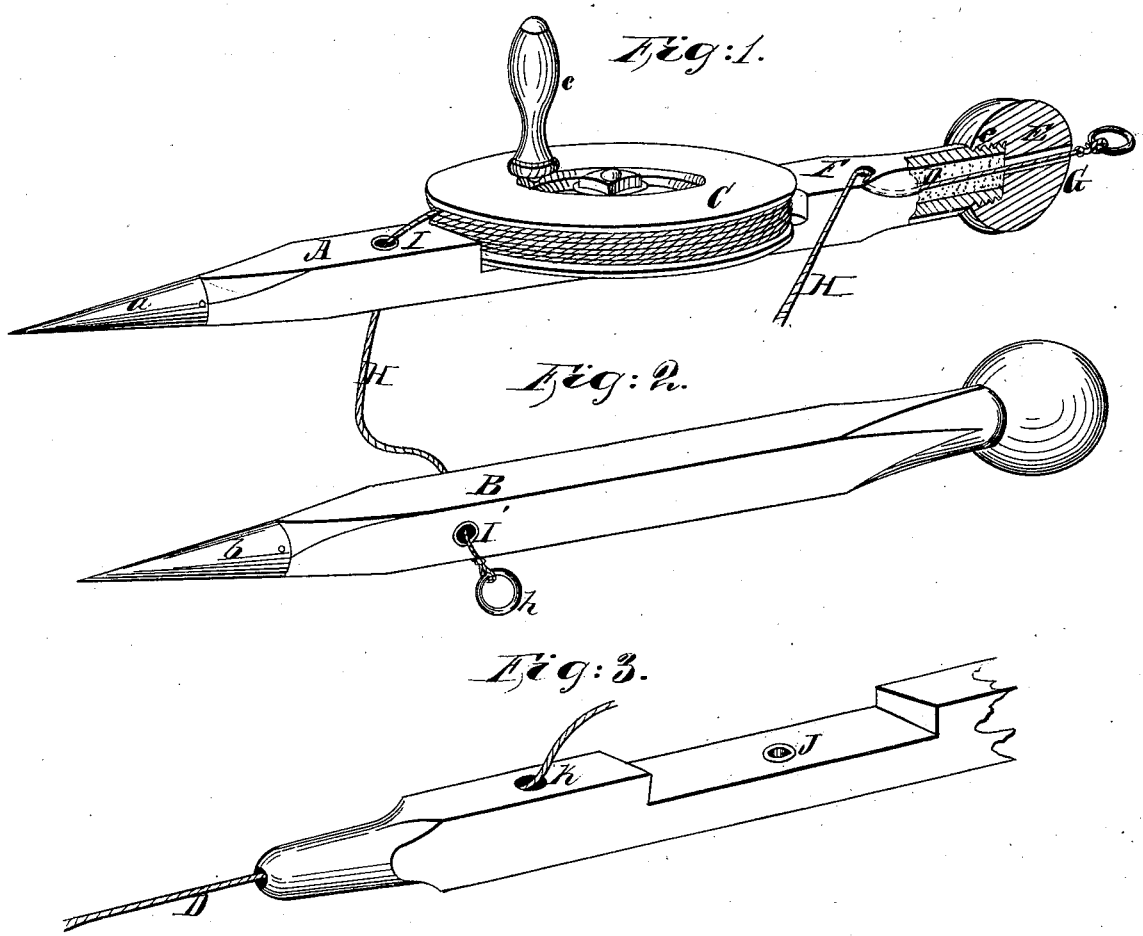

United States Patent Office.

JAMES BATHGATE, OF CINCINNATI, OHIO.

Letters Patent No. 70,684, dated November 12, 1867.

---

IMPROVEMENT IN CHALK-LINE REELS.

---

The Schedule referred to in these Letters Patent and making part of the same.

---

TO WHOM IT MAY CONCERN:

Be it known that I, JAMES BATHGATE, of Cincinnati, Hamilton county, Ohio, have invented a new and useful Line-Reel; and I hereby declare the following to be a full, clear, and exact description thereof, reference being had to the accompanying drawings, making part of this specification.

My invention relates to a new and convenient instrument, convertible to a variety of uses, such as that of a chalk-line reel for carpenters, builders, &c., a garden reel, and other purposes. In the accompanying drawings—

Figures 1 and 2 are perspective views of my improved line-reel in its most complete form, and Figure 3 is a modification of the lower portion of the staff, the reel being removed.

In its most complete form, my line-reel consists essentially of two staffs, A and B, and a reel, C, the latter being journalled to the staff A, and the staff being shod with ferrules $a$ and $b$. The reel C has a groove, $c$, of sufficient depth to contain the line, and is provided with a handle, $c'$, by which it is rotated. The upper end of the staff A is provided with a receptacle, D, for containing pulverized chalk or whiting, and this receptacle is closed by a cap, E, which is connected to the staff by the screw-threaded portion $e$. An aperture, F, which communicates with the lower end of the receptacle D, and an aperture, G, in the cap E, permit the line H to be unwound from the reel and drawn out through the pulverized chalk. This form of reel is designed more especially for the use of carpenters, builders, cabinet-makers, &c., who are frequently compelled to describe long straight lines upon their work, and it will be seen that, as the cord H issues from the aperture G, it is coated with the pulverized chalk, and the workman can apply it in an instant, and without being compelled to resort to the tedious process of "chalking the line" by hand.

For the use of bricklayers, stone-masons, gardeners, and others, I run the line H through an aperture, I, in the staff A, and also through an aperture, I', in the staff B, and I attach the end of the line to a ring, $h$. The apertures I I' are bushed with metallic tubes, so as to prevent the line from wearing out too rapidly. In laying horizontal courses of bricks or stones, the mason, instead of attaching a stone or other weight to each end of his line, for the purpose of keeping it straight, uses the two staffs, A and B, for that purpose, the line being wound around the handle of the reel, so as to prevent its rotation. For describing circular arcs the reel is used in the following manner: A sufficient amount of line is unwound so as to correspond with the radius of the required curve, and the line is wrapped around the staff A so as to prevent the rotation of the reel. The operator then forces the tapering end of this staff into the ground, and with the point of the other staff B he describes the required curve. If preferred, the line may be taken out through the lower end of the shaft A, as at L, fig. 3.

I claim herein as new and of my invention—

The combined arrangement of the reel C $c$, chalk-receptacle D, cap E, apertures F G, and line H, all constructed and employed as and for the purposes specified.

In testimony of which invention I hereunto set my hand.

JAMES BATHGATE.

Witnesses:
GEO. H. KNIGHT,
JAMES H. LAYMAN.